United States Patent [19]

Cornwell et al.

[11] 4,039,170

[45] Aug. 2, 1977

[54] SYSTEM OF CONTINUOUS DUSTLESS MIXING AND AERATING AND A METHOD COMBINING MATERIALS

[76] Inventors: Charles E. Cornwell, 7104 Marlan Drive; Mark Plunguian, 6912 Columbia Drive, both of Alexandria, Va. 22307

[21] Appl. No.: 610,990

[22] Filed: Sept. 8, 1975

[51] Int. Cl.² ............................................. B28C 5/06
[52] U.S. Cl. ........................................ 259/147; 259/151
[58] Field of Search ................... 259/147, 151, 60; 239/8

[56] References Cited

U.S. PATENT DOCUMENTS

| 1,373,829 | 4/1921 | Perdue | 259/4 AB |
| 3,237,805 | 3/1966 | Stogner | 259/147 |
| 3,343,818 | 9/1967 | Plemons et al. | 259/147 |
| 3,620,231 | 11/1971 | Miller | 259/147 |
| 3,685,807 | 8/1972 | Campbell | 259/147 |
| 3,819,157 | 6/1974 | Markfelt | 259/147 |
| 3,827,888 | 8/1974 | Terwilliger et al. | 259/4 A |

*Primary Examiner*—Richard E. Aegerter
*Assistant Examiner*—L. Footland

[57] ABSTRACT

This invention consists of a method of continuous dustless mixing and aerating of cementitious compositions and a mechanical arrangement for conveying and combining materials.

3 Claims, 5 Drawing Figures

SYSTEM OF CONTINUOUS DUSTLESS MIXING AND AERATING AND A METHOD COMBINING MATERIALS

SUMMARY OF THE INVENTION

This invention relates to a method of mixing a wide range of materials without creating dust problems, without the use of costly and complicated equipment, and with a minimum expenditure of energy and manpower. It relates in particular to mixing of dry cementitious materials to form well-mixed, uniform pastes, mortars, and concrete products.

The conventional method of mixing cementitious materials is well known, such as by the use of large mixing plants supplying ready-mix trucks, and the use of stationary concrete mixers. These involve the creation of dust and the use of massive equipment. Clean-up before setting of the cement is always a problem. Another method of placing concrete is by shotcreting and gunniting, whereby the dry blend of cement and aggregate is conveyed by air to a nozzle there to be wet out by a stream of water just before it leaves the nozzle. In this system there can be as much as a 50% loss of material due to incomplete mixing and wetting of the cement and aggregate.

This invention makes use of the so-called static in-line mixers. Many designs of such static mixers are described in the patent literature. At this time we prefer to use the type of mixers disclosed in U.S. Pat. No. 3,785,620 and 3,871,624. These mixers are not claimed herein as an invention, but rather as a part of the entire system.

There are several aspects of the system which can be used separately or combined into one overall scheme to accomplish several important functions. These aspects may be summerized as follows:

1. Starting with a stabilized foaming solution, such as those disclosed in U.S. Pat. No. 3,819,388 granted to one of us, in U.S. patent application Ser. No. 501,673, filed Aug. 29, 1974, and in U.S. patent application Ser. No. 585,496, filed June 10, 1975 by the present inventors, a stable fine-celled foam is produced by conveying the diluted foam concentrate with air through the static mixer. The stable foam has several important applications. It may be mixed with cementitious slurries, to reduce the density after setting and thus yield insulating, fireproofing and sound absorbing structures. Other important applications are for fire fighting. By laying down a blanket of foam, the oxygen supply is eliminated and the fire is extinguished. The foams may be used for foaming of runways for crash landing of aircraft.

2. Dry cement powder is conveyed by air to the entrance of the static mixer. There it is wet out with the right amount of water and conveyed through the mixer. An homogenized cement paste is thus produced with a low ratio of water, such as 0.35 to 1.0 of cement. The paste is discharged at reduced pressure into ready-mix trucks along with the required aggregate to be mixed in transit to the job site. This further mixing with aggregate can also be done in stationary mixers.

3. In this scheme the use of the costly ready-mix trucks or stationary mixers is eliminated. An aggregate blend of the desired composition and required proportion is added to the homogenized paste after the first static mixer and conveyed through a second static mixer to yield either a spray which can be applied with force to a substrate without significant loss of material, or discharged at a reduced pressure.

4. The cement powder and dry aggregate can be preblended, air conveyed to the static mixer, and there wet out with the required amount of water, and further conveyed through the static mixer.

5. The above function can be combined to include the injection of prefoamed foam at the outlet nozzle, thus producing cellular lightweight cementitious compositions most useful for placing of low density insulation, fireproofing, and sound absorbing structures. The amount of foam-producing solution can be reduced, dispersed in the water phase and conveyed through the common static mixer to produce higher density air-entrained cementitious products. Other additives may be introduced in the water stream, such as accelerators, retarders, or water reducers.

The various systems and sequence of events can be computerized for full automation, or be manually operated.

This invention offers the following important advantages, compared to the customary methods of mixing cementitious materials:

1. Speed of mixing is very rapid.
2. Labor requirements are reduced
3. There is less waste of material.
4. It is economical in operation.
5. Cleanliness can be maintained more readily.
6. The element of human error is reduced.
7. A more uniform product can be produced.
8. The set product is stronger because of thorough homogenization of the cement and the use of lower ratio of water.
9. It is versatile.
10. It can be used more readily in relatively inaccessible job sites.
11. A wide range of density control is possible, from a waterproof, high density concrete with the use of a lower water ratio and high pressure spraying, to low densities with the use of the selected aggregates and controlled admixture of foam.
12. The mixed concrete can be sprayed with force unto substrates or be discharged at reduced pressure.
13. The use of ready-mix trucks, and transportation to the mixing plant of raw materials can be eliminated.
14. The use of bucket conveyance, concrete buggies, pumps, cranes, and piping can be eliminated.

DESCRIPTION OF THE FIGURES

Reference is made to the following figures, wherein.

DETAILED DESCRIPTION OF FIGURES

Figure 1:
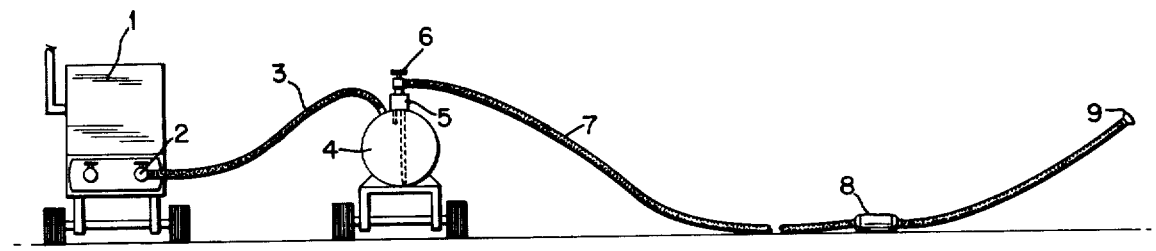
FIG. 1 is a schematic representation for generating a foam from a potential foaming solution and compressed air.

FIG. 1 shows the production of fine-celled stable foam. Compressed air 1 is conducted through a metering valve 2 and hose 3 to a pressurized tank holding diluted foaming concentrate 4. The compressed air serves both for conveying the liquid through the hose 7 to the static mixer 8 as well as for mixing with the liquid, regulated by valves 5 and 6 to provide the air-cells in the foamed product, to be discharged through nozzle 9.

Figure 2:
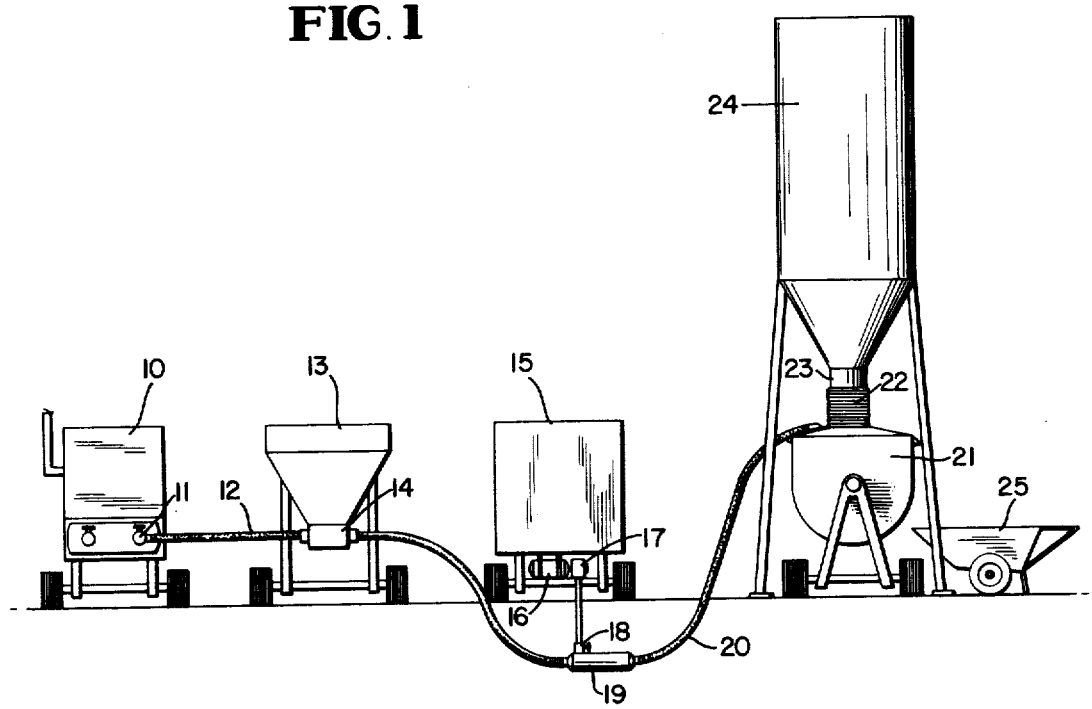
FIG. 2 shows the conveying of cement with compressed air, mixing with water in a static in-line mixing device, and further admixture of aggregate in a power mixer.

FIG. 2 illustrates the production of an homogenized cement paste and its further admixture to aggregate in a power mixer. Compressed air from 10 conveys cement powder from 13 through a metering valve 14. Just before entering the static mixer 19 the powder is wet out with water from 15, metered through 17 and 18. The homogenized paste is discharged through a hose 20 to a power mixer 21, there to be mixed with aggregate from storage 24 and the mixed concrete is discharged into a buggy 25.

Figure 3:
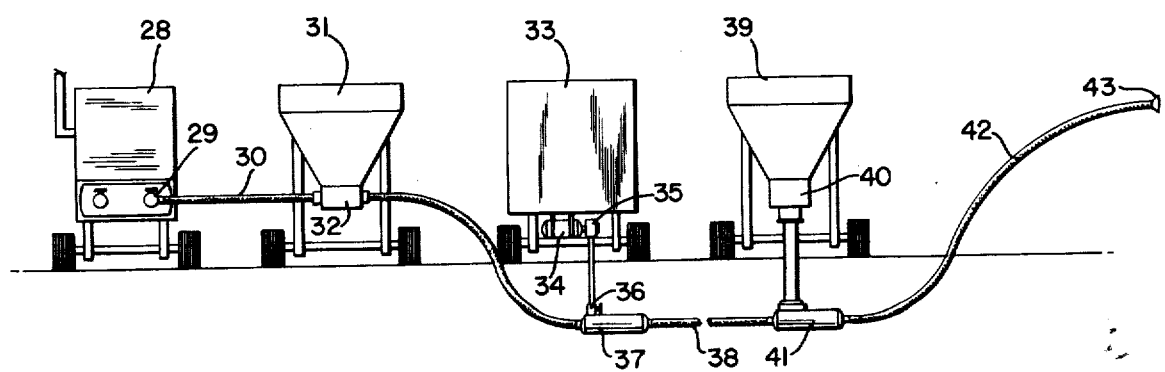
FIG. 3 carries the continuous mixing a step further in that the aggregate is also admixed continuously.

FIG. 3 shows the elimination of any power mixers for the production of mortar or concrete. The homogenized cement paste being discharged from the static mixer 37 through nozzle 38 is mixed with aggregate 39 through a second static mixer 41 and discharged through hose 42 and nozzle 43.

Figure 4:
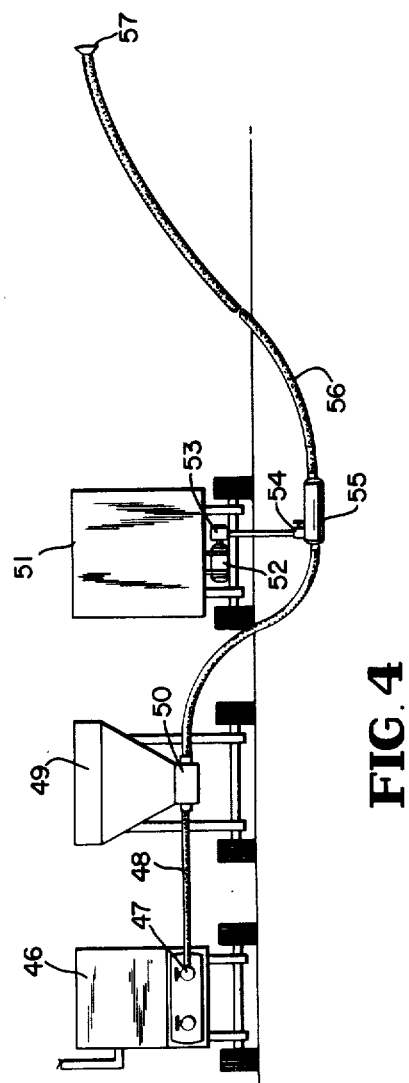
FIG. 4 demonstrates a variation of the scheme in FIG. 3 in that the cement and dry aggregate are preblended, conveyed pneumatically and mixed continuously with water.

FIG. 4 shows an apparatus for the continuous production of homogenized mortar or concrete. Compressed air from 46, metered by control 47 to a hose 48, is used to convey a controlled amount (50) of cement and aggregate from hopper 49, which is wet out with water from reservoir 51 conveyed through pump 53 driven by motor 52 through a control valve 54, to form a mortar, just before entering a static in-line mixer 55, and is conveyed through the mixer and hose 56 to a discharge nozzle 57.

Figure 5:
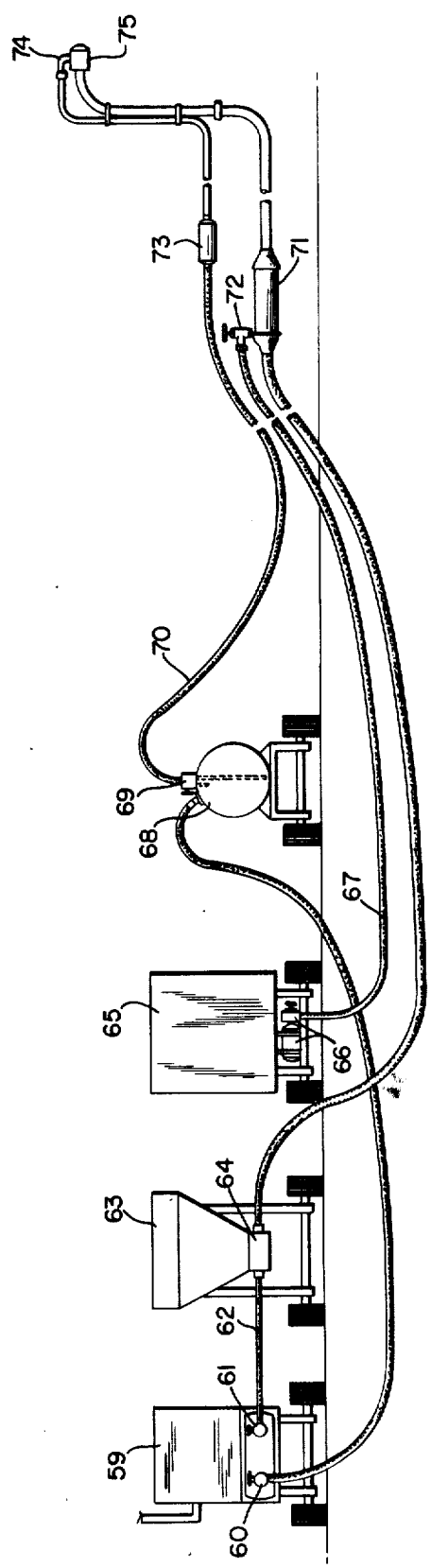
FIG. 5 adds the introduction of prefoamed foam at the nozzle to the above series of steps.

FIG. 5 shows the addition of preformed foam to the mixture of wet-out mortar shown in FIG. 4. The compressed air reservoir 59, the hopper for storage of cement and aggregate 63, and water reservoir 65, with their connections and metering controls are the same as for FIG. 4. The compressed air reservoir 59 has an additional outlet 60 which leads to a reservoir 68 containing a foaming solution. The foaming solution is mixed with air at 69, conveyed by air pressure through 70 to a foam generator 73, and then through 74 to the discharge nozzle 75. The preformed foam can also be added at 72, just before entering the static in-line mixer 71. This operation can produce on setting low density cementitious products most useful for insulation, fireproofing, and sound proofing.

What is claimed is:

1. A continuous process for the production of cementitious compositions comprising the steps of simultaneously supplying separate flows of water and a blend of dry cement and aggregate to a common junction where the flows are intermixed into a common flow upon coming in contact; moving the common flow through a path containing a series of angularly disposed baffles causing a turbulence and uniform mixing of the combined flows; further comprising adding a flow of preformed foam to the flow of mixed cementitious composition and conveying the final combined flows to a discharge nozzle.

2. The process of production of claim 1 wherein the cement is selected from the group consisting of portland cement, calcium aluminate cement, and gypsum cement.

3. The process of production of claim 1 wherein cement additives are admixed to the cementitious composition, such additives being selected from the group of materials comprising curing accelerators, retarders, and water reducers.

* * * * *